United States Patent [19]
Giannella et al.

[11] 3,934,759
[45] Jan. 27, 1976

[54] MULTIPLE DISPENSING HEAD FOR MILK SHAKE MACHINES

[76] Inventors: Frank Giannella, 3 Emeline Drive, Hawthorne, N.J. 07506; Enzo Pellicciari, 140 Hepburn Road, Clifton, N.J. 07012

[22] Filed: Feb. 28, 1975

[21] Appl. No.: 554,263

[52] U.S. Cl. ........... 222/129.1; 222/144.5; 222/145
[51] Int. Cl.² ............................................. B67D 5/56
[58] Field of Search .............. 222/129.1, 145, 144.5, 222/146 C, 132, 135, 136, 133

[56] References Cited
UNITED STATES PATENTS

| | | | |
|---|---|---|---|
| 3,276,633 | 10/1966 | Rahauser | 222/129.1 |
| 3,460,716 | 8/1969 | Thomas | 222/129.1 |
| 3,830,407 | 8/1974 | Wierlo | 222/145 |

*Primary Examiner*—Allen N. Knowles
*Attorney, Agent, or Firm*—James J. Cannon, Jr.

[57] ABSTRACT

An improved mixing, blending and dispensing apparatus for milk shake machines in fast food restaurants which dispense a plurality and a variety of selected flavored milk shakes simultaneously. An unflavored comestible, such as a milk shake mix, or the like, is injected under pressure into a premix chamber together with a selected flavor syrup. As the comestible substance and the flavor syrup flow toward a mixing chamber, they tend to blend together. In the mixing chamber the comestible and the flavor syrup are throughly mixed by an agitator-mixer rotatably mounted within the cylindrical mixing chamber and forced downward through a dispensing nozzle into a serving container. The injection of both of the comestible substance and flavor syrup under pressure into a premixing chamber, the subsequent flow of this combination mixture into the mixing chamber, the action of a rapidly moving flexible shaft mixer, and its forced exit through a dispensing nozzle combine to produce a throughly mixed milk shake of consistent flavor and color, while leaving the mixing chamber relatively clean and free of food products, avoiding carry-over between flavors and permitting rapid service.

9 Claims, 7 Drawing Figures

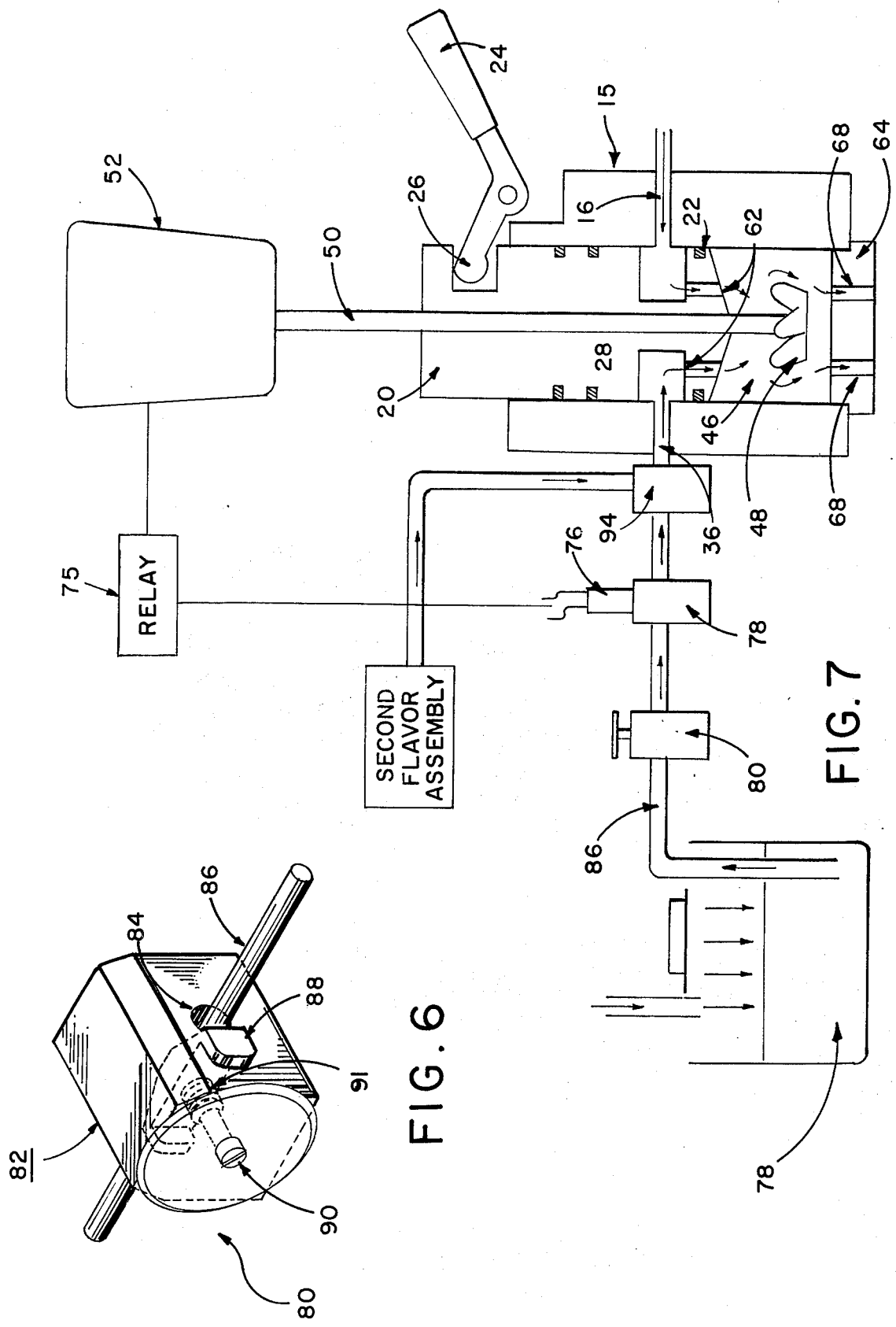

MULTIPLE DISPENSING HEAD FOR MILK SHAKE MACHINES

BACKGROUND OF THE INVENTION

1. Field of the Invention

The invention resides in the field of food dispensing machinery and more particularly relates to a multiple mixing and dispensing head for multi-flavored high speed milk shake machines wherein an unflavored comestible base is mixed with one of a plurality of flavor syrups and rapidly dispensed at the point of sale.

2. Description of the Prior Art

Milk shake machines are readily available on the commercial market and well known in the prior patent art. However, recent changes in the food service industry have made the older-style machines inefficient and consequently uneconomical. The rapid proliferation of fast food restaurants has created a need for extremely rapid dispensing of food products. It has also caused an intensely competitive market in which speed of service, quality of product both in taste and appearance, economy of pricing and variety of menu items become revelant factors in the financial feasibility of a restaurant. Additionally, new and stricter restaurant sanitation codes and improved enforcement of these sanitation codes have created a need for improved and simplified food dispensing machinery. The improved mixing and dispensing head for milk shake machines disclosed in this application is specifically directed to overcoming limitations of the prior art devices in satisfying the changed market conditions just mentioned.

Among the variety of devices designed for the same purpose as the present invention two are fully described and known in the prior art. One such dispensing head is disclosed in the U.S. Pat. No. 3,276,633, Rahauser, in which a basic multi-flavored unit using an individual mixing chamber and beater for each separate flavor is described.

A refinement of this approach including a specifically adapted beater blade and scraper is revealed in U.S. Pat. No. 3,830,407 issued to Edward Wierlo.

To applicant's knowledge, none of the dispensing heads described in these patents or in other prior art literature utilize a premix chamber wherein the neutral comestible and flavoring are both injected under pressure and partially pre-mixed by a turburlence prior to a final mixing by a flexible shaft beater. As will be described below, such pre-mixing results in a highly homogonized mixture, eliminating streaking of colors and flavors or patches of unmixed flavor and comestible which detract from the appearance and taste of the dispensed product as received and eaten by the consumer.

These prior patents adequately describe the functions of milk shake machines and dispensing heads. The multiple mixing and dispensing head of the present invention represents an improvement over these and other prior art devices in several ways. First, the multiple head apparatus of the present invention does not require a separate mixing beater and dispensing nozzle for each flavor. In the embodiment illustrated there are three mixing beaters and dispensing nozzles, each of which can mix and dispense two flavors. In practice, one mixing beater and dispensing nozzle is equipped with only one flavor injector so that unflavored comestible may be dispensed for the preparation of non-standard flavored milk shakes. This five flavor capability plus the custom flavor option from a single milk shake machine represents a significant improvement in menu variety for fast food restaurant in a competitive market. The applicant knows of no other commercially available milk shake machine with this capability.

Additionally, the design and construction of the multiple mixing and dispensing head as disclosed herein provides the fastest mixing and dispensing apparatus commercially available. Its speed eliminates the need to pre-package milk shakes for later sale at peak hours, thus improving the quality and appearance of the sold product. The multiple head of the present invention permits the mixing and dispensing of two or more milk shakes of different flavors simultaneously. Furthermore, all the mixing and dispensing nozzles are served from a single reservoir or unflavored comestible.

Furthermore, the design and construction of the multiple mixing and dispensing head as disclosed herein is greatly simplified, uses a minimum of parts and is easily disassembled and reassembled for cleaning and sanitary purposes by usual restaurant personnel with no special training.

The multiple mixing and dispensing head for milk shake machines is designed to be used on a variety of machines whose individual components may be described in one or more of the following U.S. Pat. Nos. 3,052,381; 3,018,614; 3,742,724; 3,267,688; 3,188,826; each of which is owned by the assignee of the present application or a related party.

SUMMARY OF THE INVENTION

This invention pertains to an improved multiple mixing, blending and dispensing head for milk shake machines for mixing and dispensing a variety of flavored milk shakes from one reservoir of unflavored comestible, each head of which incorporates a premix chamber, wherein an unflavored, neutral comestible is injected under pressure, is mixed under turburlence with a selected flavoring syrup which is also injected therein under pressure, a mixing chamber in which a flexible shaft beater throughly mixes the now partially mixed comestible with the flavoring syrup, and a novel triple port dispensing nozzle which directs the mixed flavored milk shake into a container for serving.

The multiple mixing and dispensing head disclosed herein further incorporates a variety of features and a simplified construction which render it efficient to use, extremely rapid in mixing and dispensing, easy to dismantle and clean, and durable over long periods of operation. For example, a plurality of mixing and dispensing mechanisms are grouped in a single housing to serve a variety of flavors from a single reservoir of unflavored comestible milk shake mix. In the preferred embodiment, three mixing and dispensing heads are each able to dispense either of two flavors, thus permitting the rapid dispensing of six flavors of milk shake from a single machine. At least two different mixing and dispensing nozzles may be used simultaneously, each dispensing a different flavor of milk shake. The construction of the mixing and dispensing assembly allows the use of rubberized O-rings throughout the head assembly to prevent carry-over of unflavored or flavored product in the premix and mixing chambers and in the nozzle.

Plastic construction, of substances approved for utilization in food dispensing machinery, may be used in construction of components of the multiple head apparatus where feasible, thus allowing quick dismantling for easy cleaning and reassembly.

A removable nozzle comprised of a plurality of straightening channels to direct the mixed and flavored product emerging from the head in a vertical direction to prevent splattering is designed to fit below the beater chamber.

A manually operated control lever is used to admit comestible and flavoring to the mixing stream as well as to operate the beater motor and control other auxilary functions associated with the assembly.

These and other features will be more fully explained in the following description of the preferred embodiment with reference to the drawings.

BRIEF DESCRIPTION OF THE DRAWINGS

FIG. 6 is a front perspective view of the flavor-metering valve.

FIG. 7 is a diagrammatic view of the syrup injection assembly, including the multiflavor manifold.

DESCRIPTION OF THE PREFERRED EMBODIMENT

Figure 1:
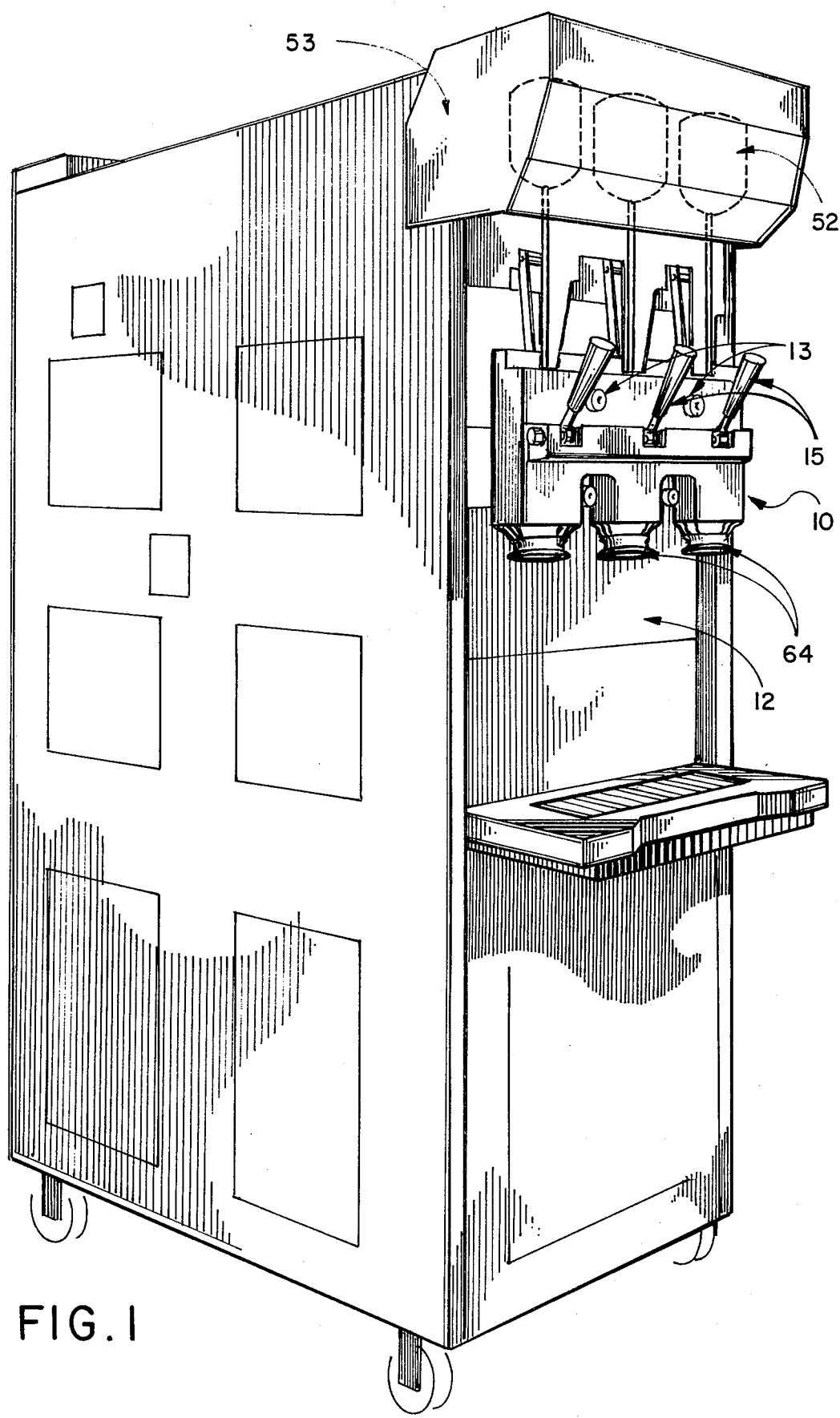
FIG. 1 is a front perspective view illustrating the multiple mixing and dispensing head apparatus of the present invention in place on a milk shake machine.

Referring now to FIG. 1, there is shown a front perspective view of the multiple mixing and dispensing head apparatus of the present invention as mounted on a milk shake machine.

Figure 2:
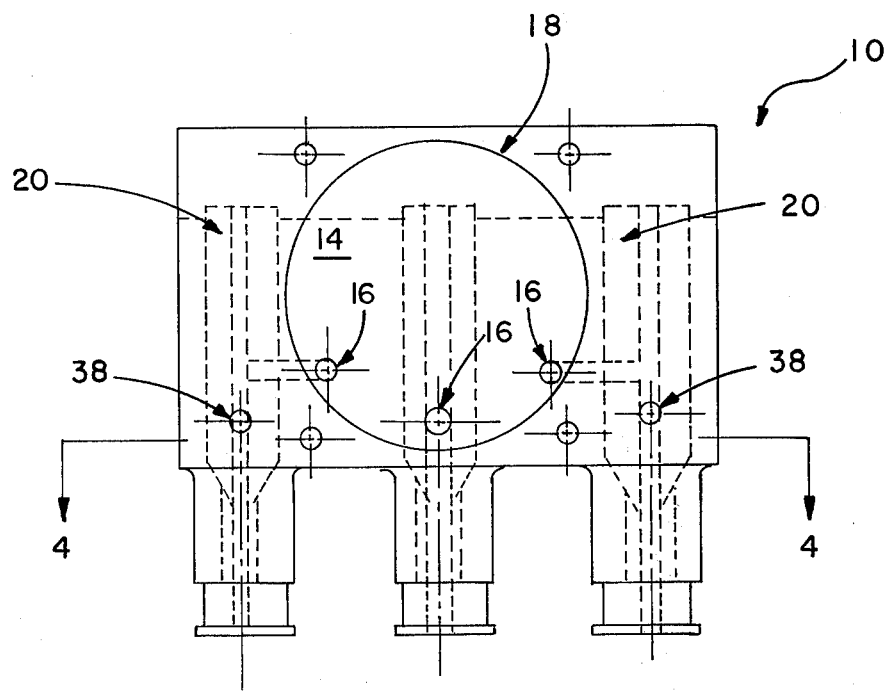
FIG. 2 is a rear view of the head of FIG. 1 showing access ports to syrup lines and comestible reservoir.

Multiple mixing and dispensing housing 10 is mounted on front panel 12 of the by four bolts 13 which may be easily removed for disassembly and cleaning of housing 10 and the parts contained therein. Unflavored comestible (milk shake mix) is contained under pressure in a cylindrical reservoir not shown behind housing 10 and in communication therewith. FIG. 2, which shows a rear view of housing 10, illustrates the various ports and channels through which such communication is achieved, as will be described hereinafter.

Figure 4:
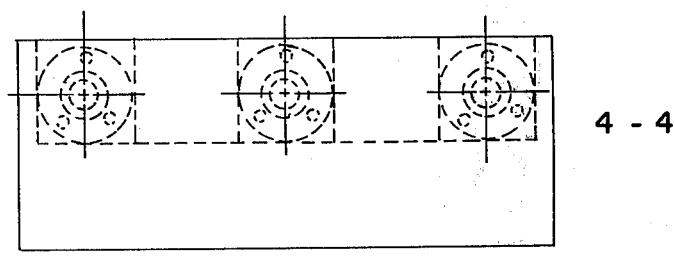
FIG. 4 is a cross-sectional diagram through section 4—4 of FIG. 2.
Figure 3:
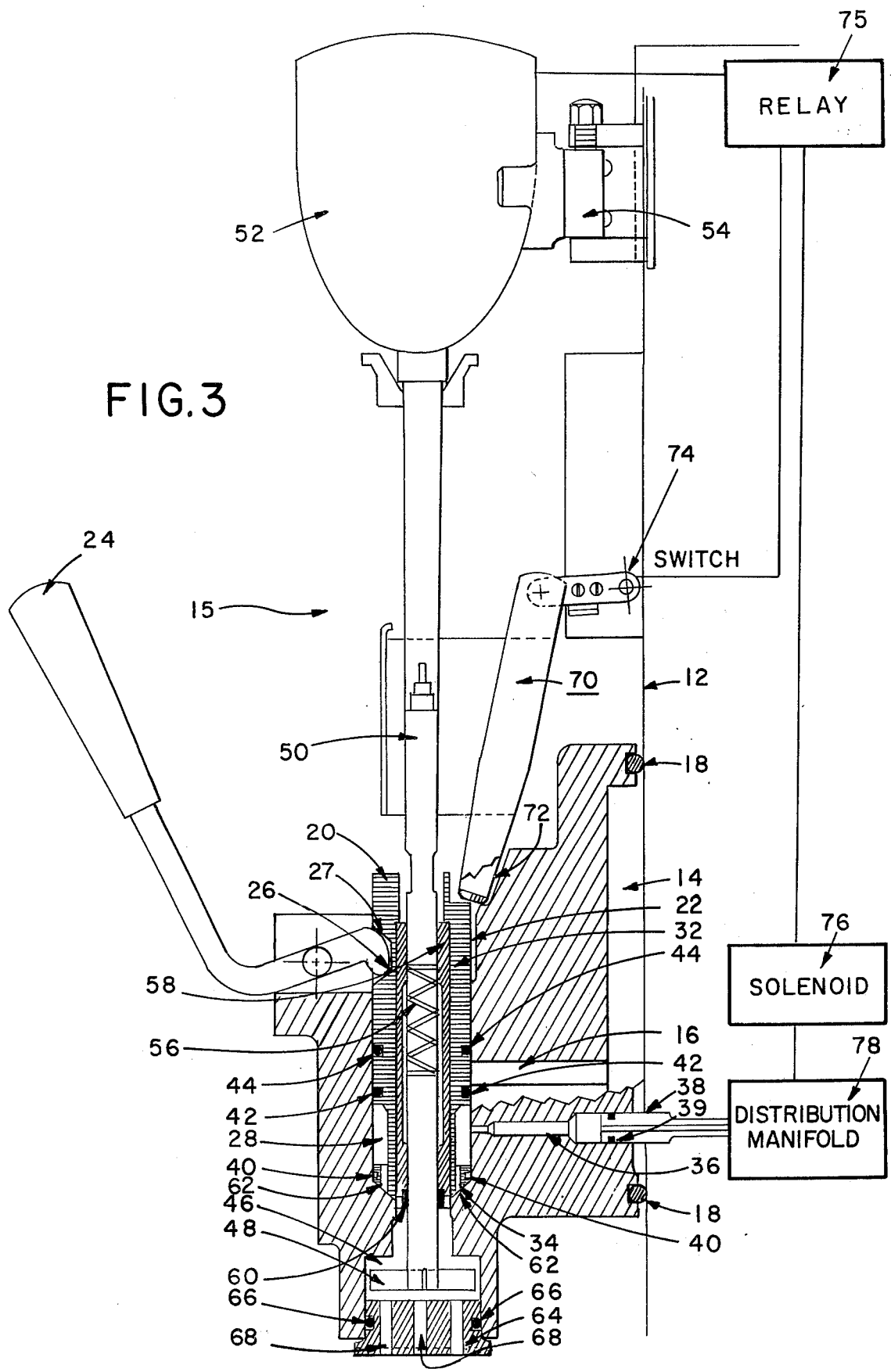
FIG. 3 is a cross-sectional diagram of the preferred embodiment of a mixing and dispensing head of FIG. 1.
Figure 5:
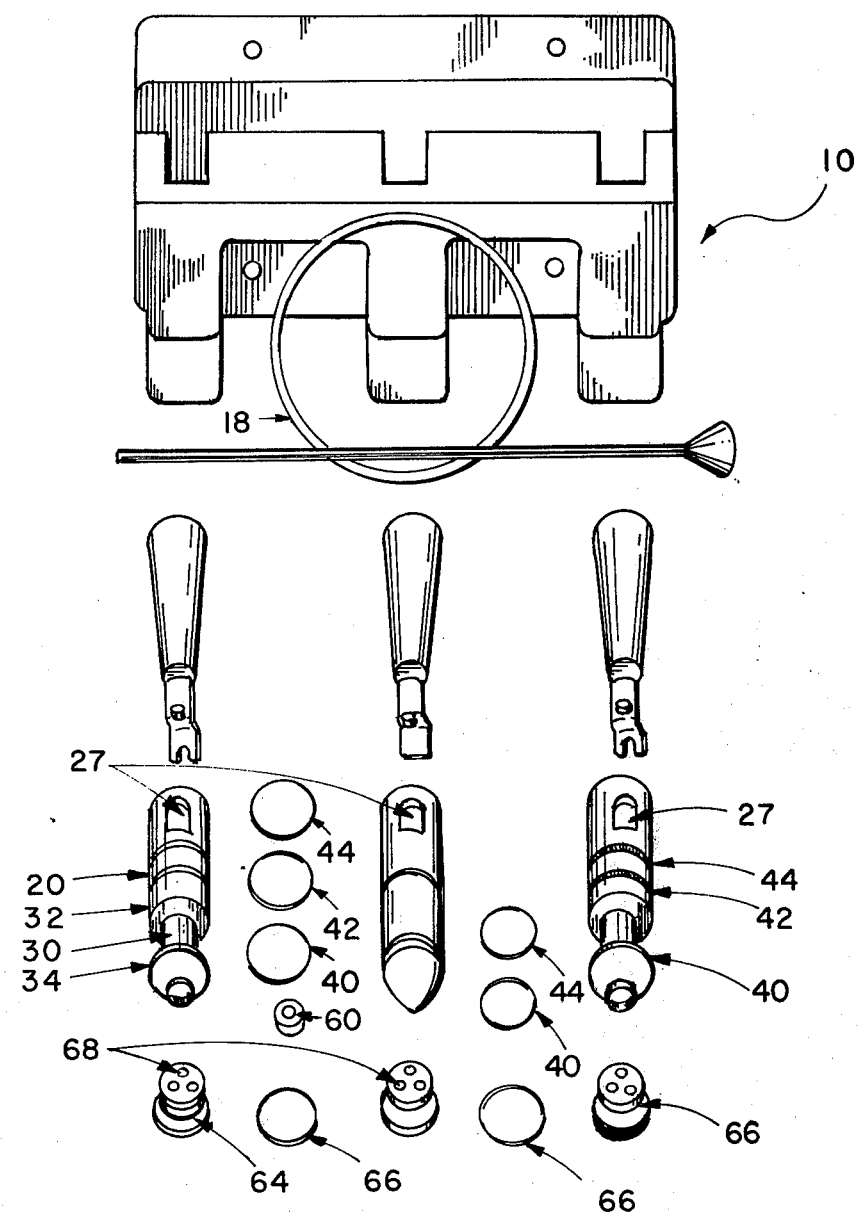
FIG. 5 is a break out perspective view of all the components in the multiple head apparatus illustrated in the cross-sectional view of FIG. 3.

FIG. 3, is a cross-sectional view of one mixing and dispensing unit 15 illustrated in the multiple head of FIG. 1. FIG. 4 is a cross-sectional view through section 4—4 of FIG. 2. FIG. 5 is a break-out perspective view showing the individual components of multiple mixing and dispensing head 10 which are illustrated in cross-section in FIG. 3. Referring now to FIG. 3 and FIG. 5, the unflavored comestible enters housing 10 under pressure from chamber 14 and is introduced into the mixing stream of one mixing and dispensing apparatus 15 through entrance port 16. O-ring 18, (FIG. 2 also) seals housing 10 against support plate 12 to prevent leakage of the comestible outside the assembly.

Piston 20 is slidably mounted within bore 22 in housing 10 and is disposed to move vertically upon manual activation of handle 24 (illustrated in FIG. 1 also) and extension cam 26 within slot 27 in the piston 20.

A premix chamber 28 is formed within the bore 22 by a middle portion 30 of the piston 20 having a lesser diameter than the contiguous portions 32 and 34 respectively. Flavoring syrup is introduced into chamber 28 under pressure through entrance port 36, and is supplied under air pressure from a compressor (not shown) through tube 38 from a source behind support plate 12. O-ring 39 prevents leakage from the rear of housing 10. O-rings 40 and 42 seal premix chamber 28 to prevent leakage of the flavoring and comestible outside the head assembly. O-rings 42 and 44 similarly prevent leakage of the partially flavored comestible outside bore 22 and serve to clean the bore 22 as piston 20 moves downward within bore 22.

A mixing and blending chamber 46 is formed in the lower portion of housing 10. Blending and mixing means such as blades 48 are positioned within chamber 46 and fixably attached to flexible vertical shaft 50. Shaft 50 extends vertically upward through piston 20 and is communication with and rotated by power source 52, the housing 53 of which is attached to front panel 12 by bracket assembly 54. Lower shaft portion 56, which is of a flexible substance, is free to rotate within sleeve bearing assembly 58, around which piston 20 is arranged to slide. Gasket 60 seals the bearing 58 against the intrusion of comestible and flavoring as the combination of the two exists from the premix chamber 28 via connecting bores 62.

Disposed below mixing and blending chamber 46 is a dispensing nozzle 64 force fitted into housing 10 and secured against leakage by O-ring seal 66. A plurality of channels 68 extend downward through nozzle 64 to produce a vertically-oriented exit stream which minimizes splashing and spattering as the flavored milk shake exits from nozzle 64 under pressure.

In operation, when handle 24 is pulled downward and outward by the operator, cam 26 raises piston 20 which, in turn, causes lever 70 to slide upwards by surface 72 and activate switch 74 which controls relay 75, power source 52 and solenoid 76, which controls flavor valve 80, (FIG. 7).

FIG. 6 is a front perspective view of the flavor syrup control valve 80, which controls the quantity of flavoring syrup injected through distribution manifold 78. Valve 80 consists of a block 82 having a cylindrical opening 84 therein through which syrup tube 86 passes. Also within opening 84 is a grooved plunger 88 which is placed against tube 86. A screw 90 having a threaded shank 91 is received into the threaded hole 92 within block 82. Tightening or loosening screw 90 moves the end of shank 91 toward or away from plunger 88, causing the effective interior diameter of tube 86 to be increased or decreased, thus controlling the quantity of syrup moving through tube 86 to premix chamber 28. One such valve 80 is required for each flavor syrup used in the multiple mixing and dispensing head disclosed herein.

FIG. 7 is a diagrammatic view of the syrup injection assembly including the multi-flavored manifold 78, illustrating the utilization of two flavor conduits to supply flavor syrup of two different flavors to a single premix chamber 28. As in all other figures, like reference numerals refer to like parts of the other figures. When two flavors are dispensed to a single premix chamber 28, it is preferable that the two flavors be related, such as chocolate and mocha, or strawberry and cherry, to minimize the effect of flavor carry-over in tubing not cleaned by the various O-rings described supra.

In operation a mixing and dispensing head 15 is supplied with an unflavored comestible injected under pressure through entrance port or conduit 16 and a portion of flavoring syrup is injected under pressure through entrance port 36. When an operator pulls handle 24 downward and outward, cam 26 raises piston 20 within bore 22 to bring the premix chamber 28 coincident with port 16 and thereby releases a portion of comestible which is retained under pressure in the supply reservoir into said premix chamber 28. Piston 20 acts upon lever 70 to engage switch 74 which opens relay 75, solenoid 76, and valve 80, causing the release of a portion of flavor syrup from a syrup reservoir 78 where syrup is also retained under air pressure. If more than one syrup can be dispensed into the selected mixing and dispensing apparatus controlled by handle 24, the selection of a particular syrup is achieved by an operator control (not shown) on the front panel 12 of the milk shake machine.

The pressurized injection of unflavored comestible and flavoring syrup into premix chamber 28 results in a partial mixing of milk shake mix with flavor prior to the entry of both substances into the mixing chamber 46. This partial mixture is forced downward through channels 62 which are clear and to exit into mixing chamber 46, because piston 20 is in a raised position. Since the mixture has been partially blended, and power source 52 is similarly activated by switch 74 to rotate shaft 50 to which blades 48 are connected, the time required for beater blades 48 to mix and blend completely the comestible and the flavor is minimal. The upstream pressure forces the resulting flavored milk shake downward through channels 68 and nozzles 64 into a suitable serving container below nozzle 64. The resultant milk shake has a uniform flavor and appearance because of the thorough mixing described supra.

As described supra head 16 is one of three heads mounted within housing 10 and served by a single reservoir source of unflavored comestible. While theoretically each of the three heads may be operated independently of the others and simultaneously with the others, in practice the middle head is usually restricted to one flavor and limitations of space combined with the size of normal operators in a restaurant limit the utilization of a single machine to two dispensing nozzles simultaneously.

We claim:

1. A multiple head mixing, blending and dispensing apparatus for mixing and dispensing a variety of flavored comestibles such as milk shakes from a single machine having a reservoir of unflavored comestible and reservoirs of flavoring syrups, comprising:
    a housing mounted on the front panel of a milk shake machine in communication with its reservoir of unflavored comestible and its reservoirs of flavoring syrups;
    a plurality of mixing, blending and dispensing heads mounted within said housing, each of which is in communication with said reservoir of unflavored comestible and each of which is in communication with at least one reservoir of flavoring syrup; and each of which may be operated simultaneously with the others;
    selection means to select the desired flavoring syrup to be mixed, blended and dispensed from each head;
    a premix compartment within said housing communicating with said comestible and flavor reservoirs;
    a comestible inlet port for admitting said unflavored comestible under pressure into said premix compartment;
    at least one flavoring inlet port downstream from said comestible inlet port for admitting a flavoring under pressure into said comestible flow entering said premix compartment;
    a blending compartment within said housing downstream from and communicating with said premix compartment;
    a plurality of channels interconnecting said premix chamber to said blending compartment;
    said premix compartment, in combination with said comestible and flavor pressurized flows and said channels, being disposed to produce a turbulent mixing of said flavoring and said comestible;
    blender means rotably mounted within said blending compartment;
    blender power means rotating said blender;
    a dispensing nozzle attached to said housing downstream from and communicating with said blending compartment; and
    manually operable control means for actuating said blender power means, for controlling the flow of said comestible, and for controlling the flow of said flavoring within said head;
    a dispensing nozzle attached to said housing downstream from and communicating with said blending compartment; and
    manually operable control means for controlling the flow of said comestible, and for controlling the flow of said flavoring within said head and for activating said blender power means.

2. The apparatus of claim 1 including a plurality of flavoring inlet ports for admitting a flavoring under pressure into said premix compartment and wherein said manually operable control means is arranged to selectively control the flow of said flavorings through said flavoring inlet ports.

3. The apparatus of claim 1 wherein said dispensing nozzle is comprised of a plurality of straightening channels.

4. The multiple mixing, blending and dispensing head of claim 1 wherein each of said heads comprises:
    a bore within said housing, said housing further having a comestible inlet port communicating with said bore for admitting an unflavored comestible under pressure into said bore, said housing further having at least one flavoring input port of admitting a flavoring under pressure into said bore;
    a piston slidably mounted in said bore, said piston having an upper, a middle and lower portion, said upper and lower portions fitting snuggly within said bore, said middle portion of a lesser diameter than said upper and lower portions, said middle portion defining a premix compartment within said bore;
    lever means to slide said piston within said bore to bring said middle portion coincident with said comestible inlet port and said flavoring inlet port;
    a blending compartment within said housing, said blending compartment positioned downstream from and communicating with said piston middle portion;
    a plurality of channels interconnecting said premix compartment with said blending compartment;
    a blender blade rotably mounted within said blending compartment;

a power shaft attached to said blender blade extending axially through said piston;

blender power means for rotating said power shaft and said blender blade;

at least one dispensing nozzle comprised of straightening channels attached to said housing said nozzle positioned downstream from and communicating with said blending compartment; and switch means for activating said blender power means, for controlling the flow of said comestible and for controlling the flow of said flavoring within said head.

5. The apparatus of claim 4 wherein said switch means are activated by said sliding piston.

6. The apparatus of claim 4 further including seal means attached to said piston for preventing said comestible and said flavoring from escaping from the extremities of said bore.

7. The apparatus of claim 6 wherein said seal means comprises O-rings.

8. The apparatus of claim 4 wherein said housing and said piston are comprised of a plastic material.

9. The apparatus of claim 4 wherein a portion of said power shaft is compressible.

* * * * *

UNITED STATES PATENT OFFICE
CERTIFICATE OF CORRECTION

Patent No. 3,934,759            Dated January 27, 1976

Inventor(s) Frank Giannella

It is certified that error appears in the above-identified patent and that said Letters Patent are hereby corrected as shown below:

Assignee should read:

Coldelite Corporation of America,

Bergenfield, N. J.

Signed and Sealed this

Thirteenth Day of July 1976

[SEAL]

Attest:

RUTH C. MASON
*Attesting Officer*

C. MARSHALL DANN
*Commissioner of Patents and Trademarks*